(12) United States Patent
Bourges-Waldegg et al.

(10) Patent No.: US 7,996,856 B2
(45) Date of Patent: Aug. 9, 2011

(54) PROCESSING APPLICATION DATA

(75) Inventors: Daniela Bourges-Waldegg, Rueschlikon (CH); Yann Duponchel, Adliswil (CH); Achille B. Fokoue-Nkoutche, White Plains, NY (US); Marcel Graf, Kilchberg (CH); Michael Moser, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 12/123,620

(22) Filed: May 20, 2008

(65) Prior Publication Data

US 2008/0222615 A1 Sep. 11, 2008

(51) Int. Cl.
*G06F 9/54* (2006.01)
*G06F 13/00* (2006.01)

(52) U.S. Cl. ........................................ 719/330; 710/100
(58) Field of Classification Search .................. 719/330
See application file for complete search history.

(56) References Cited

U.S. PATENT DOCUMENTS 6,671,757 B1 * 12/2003 Multer et al. ................. 710/100
7,747,561 B1 * 6/2010 Gupta et al. ........................ 1/1

* cited by examiner

*Primary Examiner* — Andy Ho
*Assistant Examiner* — Abdou K Seye
(74) *Attorney, Agent, or Firm* — Michael J. Buchenhorner; Vazken Alexanian

(57) ABSTRACT

An electronic device for executing an application includes: application data, a central control unit for processing the application data according to a first method call, an interface for transmitting a description of the first method call to a second electronic device, and a synchronization entity for generating the description and passing the description to the interface. The transmitted description is used by the second electronic device to derive a second method call that is executable on the second electronic device.

8 Claims, 6 Drawing Sheets (a)

(b)

PROCESSING APPLICATION DATA

TECHNICAL FIELD

The present invention generally relates to the field of processing application data.

BACKGROUND OF THE INVENTION

Today a user typically owns and/or uses multiple computing devices—for example an office desktop computer, a laptop located at home or used while traveling, a personal digital assistant PDA, a cell phone, etc.

It is common that, different electronic devices run copies of the same software applications. Such widespread software applications being installed on nearly every computing device are for example electronic phone books, electronic calendars, electronic to-do-lists, word processing software, presentation software and other standard software applications. When executing such a software application, application related data can be generated and/or modified. For example, a user can create and/or modify application data in form of a personal list of phone numbers by executing an electronic phone book software application.

Having such different electronic devices available it can be desirable to have access to such application data from at least some of these different devices in order to amend or modify that application data from different device locations. Provided that always the latest version of application data would be available among these devices, a user could keep on processing such application data from different devices. Apart from this single user/multiple device scenario, a multiple user/multiple device scenario could also benefit from such an approach: For example, it could be desirable that certain kinds of application data, for example documents or other data files, are shared between cooperating users in order to permit every user to work on them. Some text document or draft of a contract could for example be edited or revised jointly when different users need to work together.

In particular, due to installation of networks and due to definition of data transfer protocols, distributing data by storing data on a portable memory like a disk and running that disk on another device in order to make this data available there became redundant. Relying on wireless or wire-bound data networks for connecting electronic devices, there are different approaches proposed for sharing application data among different electronic devices.

One can achieve this shared application data—namely that all involved devices always at least seem to comprise the same application data—by having only a single copy of application data stored on a kind of central electronic device like an office system or some computer server. All other electronic devices actually do not maintain the application data or copies thereof but only provide means of connecting to that central copy. For example, these other electronic devices are able to fetch data from and post added or modified data to that central system, respectively to that single copy of application data.

However, in case that communication is broken, no amended or modified data can be transferred among the electronic devices.

U.S. Pat. No. 6,263,498 B1 shows a distributed data processing system including a client side application located on a client computer, wherein the client side application generates a request to access data, and including a server side application on a server computer, wherein the server side application is a dippable object that includes business rules, receives requests from the client side application and returns data to the client side application.

U.S. Pat. No. 5,544,302 discloses an object-oriented framework that is used to create container objects which are, in turn, used to hold both other objects and information. The framework itself contains a set of pre-defined class information which allows container objects to be constructed. Such pre-defined class information includes member functions which provide default editing operations such as cut, copy, paste, drag, drop, selection, move, undo and redo, which editing operations are applicable to all objects in the container. A constructed container object can be accessed by a multitude of users and may contain other objects. Inherent collaboration models support the function and communication style of a particular object. Collaboration models can support screen sharing, annotation merging and document merging. Accordingly a user selects a collaboration model with regard to a created object.

In another approach, the electronic devices involved do comprise copies of the application data, so that a user still can access and modify application data on every single device even when connection is lost between devices or is currently too expensive.

On this approach, the way in which modified parts of data or add-on data performed on one device are spread to the other devices such that all copies of application data always comprise the actual, up-to-date application data, is challenging.

Another problem is that different copies may—at least temporarily—get "out-of-sync", namely when there is currently no connection between devices or when communication between devices is slow, for example has a high latency.

Another issue on this approach is how to cope with conflict scenarios: (quasi-) concurrent changes in different data copies might occur due to nearly simultaneous exchange of data amendments or due to exchange of complete sets of application data between devices. A reason for this might be network latency or temporary disconnection which can be considered as a special case of very high communication latency.

It would therefore be desirable to provide easily shareable application data to electronic devices while minimizing required adaptations in existing hardware and software structures.

SUMMARY OF THE INVENTION

In accordance with the present invention there is provided an arrangement of electronic devices, comprising a first electronic device for executing an application, and a second electronic device for executing an application, which is preferably a copy of the application running on the first device. The first electronic device comprises application data upon execution of the application, a central control unit for processing the application data according to a locally generated method call, an interface for transmitting messages to the second electronic device, and a synchronization entity for generating a description of the method call and for passing the description to the interface. The second electronic device comprises a copy of the application data, an interface for receiving messages from the first electronic device, a synchronization entity for receiving the description from the interface and for deriving a method call from the description that is executable on the second electronic device, and a central control unit for processing the copy of application data according to the derived method call.

The present invention also extends to a method of processing a set of application data, the method comprising: operating application data on a first electronic device; operating a copy of the application data on a second electronic device; on the first electronic device: generating a method call for processing the application data, generating a description of this method call, processing the application data according to this method call, and transmitting the description to the second electronic device; on the second electronic device: receiving the description, deriving a method call from said description being executable on the second electronic device, and processing the copy of application data according to the derived method call.

Basic idea of the present invention is that an electronic device that generates a method call in order to amend a local copy of application data provides one or more other electronic devices with a description of this method call. Accordingly, each other electronic device is able to amend or modify or update or else change its local copy of application data in the same way by analyzing the received description and translating it into a method call that is executable on the other electronic device. In the end, copies of application data stored on different devices are amended the same way without having transmitted any amended data or even the entire new set of application data, but by having transmitted a description of the operation that is invoked on the first device in order to cause such an amendment. Since different devices might have different method calls being responsible for invoking the same operation, a method call is translated into a higher level language that is describing the method call. This description is exchanged between devices. In this respect, not every single description has to be exchanged separately. A device can also transmit a list or a package of descriptions of method calls, preferably marked with a common time stamp in order to increase efficiency.

However, the scope of the invention is not limited to a method call that causes an amendment to existing application data. Any method call that causes any operation on existing application data or that causes creating application data is included even if there is no effect noticeable for a user. Preferably, application data represent a state of an software application. Application data are also called model. Application data can be stored in a data file or in an in-memory data structure, or in both. In a preferred embodiment, application data exhibits an internal data structure comprising data units indicating content and comprising data indicating a relationship between data units and therefore being responsible for the structure. Accordingly, application data is stored in form of a structure, for example a tree or a list structure in order to allow quick access. Accordingly, it can happen that a particular method call has impact on application data in a way that only structural relations are changed but not data units themselves.

In a computer language usually a set of operations can be performed on application data and corresponding method calls for invoking these operations are defined. The present method call will therefore usually be a method call out of a set of permitted method calls. A method call according to the present invention is causing an operation to be applied to the application data when being processed, and is preferably causing a change in the state of the application data. In the context of the invention, the relevant language is a language that can be applied to application data when running an application. A method call is preferably part of an application program interface language, which allows access to application data, in particular for modifying purposes. User inputs are preferably translated into method calls that have impact on application data when being executed and thus realize the user's input. Such an user's input can for example be evoked by means of actuating a keyboard or a computer mouse.

However, such an input does not necessarily have to be performed in connection with the particular device that is generating the method call. An input causing processing application data—for example amending, modifying or changing these application data—can also have its origin on other devices and be transmitted to the translating device that locally interprets the transmitted input and creates a corresponding method call.

The central control unit may comprise a microcomputer processing respective software, or include hardwire logic, or be embodied partly as hardware and partly as software, or be embodied in any other form or be understood as a function.

The interface for connecting electronic devices can comprise all what is needed to make the linked components work together. This might comprise hardware to make a connection work, software, and protocols. Such a connection can be realized in a wireless or wire-bound manner. Bluetooth or wireless LAN 802.11 are examples for such wireless interfaces covering the field of short range data communication and being applicable to the present invention among other short and/or wide range communication interfaces. The interface is transmitting and/or receiving messages to/from other devices such that an exchange of information is provided. With regard to the invention, a description of a method call is content of such a message.

With regard to the treatment of locally generated method calls, the synchronization entity intercepts execution of a method call, translates the method call into a description of the method call and takes care of distributing this description to the interface for generic replication purposes. Simultaneously or afterwards, the method call can be passed on by the synchronization entity to be executed on the local copy of application data. In another preferred embodiment, the method call can be derived from its description and then be executed on the local copy of application data. Accordingly, the respective operation is processed locally. With regard to the treatment of remotely generated method calls, the synchronization entity is configured for receiving a remotely generated description of a method call from the interface, for translating it into a locally executable method call and for passing it on such that it can be invoked on the local copy of application data. Accordingly, the respective operation is processed. The inventive synchronization entity is basically a part of the present inventive electronic device that takes care of synchronizing local application data with copies of application data on at least one other device. Making latest versions of application data available on different devices is also referred to as "synchronization".

Two or more devices can form a synchronization network, each device having a synchronization entity for latest versions of application data available.

It is a major advantage of the invention that existing application data can be turned into "shareable" or "distributed" application data while minimizing changes of existing and well-tested application code and/or operating system code, and therefore allowing to maintain an application's familiar programming interface to the maximum possible extent. Overall, only few modifications to an original program are required and revalidation/debugging mechanisms of an already existing and proven single-user application can be turned to an absolute minimum.

With regard to data traffic between devices, the invention requires only small data amounts to be exchanged, since only descriptions of method calls are exchanged between the devices and not entire application data files or parts thereof. Even when connection between devices is temporarily not established, a user of the disconnected device is not prevented from continuing processing the application, since the local copy of application data still offers this possibility.

This synchronization entity—which can also be called interceptor—can preferably exhibit the same Application Program Interface (API) as the original application model does in order to receive the method calls for replicating purposes. The synchronization entity on the other hand can cause all locally generated and/or remote generated and locally translated method calls to be applied to the application data, thus having the same Application Program Interface (API) for passing on these method calls to be applied to the application data, and thus allowing to keep input and output behavior of the application software completely unchanged. Especially this preferred embodiment allows to convert existing application data and the underlying application software into "shareable" or "distributed" application data respectively application software while minimizing changes of existing, well-tested code and allowing to maintain an application's familiar programming interface to the maximum possible extent.

In another preferred embodiment of the present invention, the synchronization entity is software implemented. In this context the synchronization entity is implemented as so-called replication middleware. A middleware is understood as a piece of software that mediates between possibly disparate software systems and that is not made to be used directly by users but by software modules. It typically has the capability to perform jobs or actions for many different applications in a sense that its functions can be used by different applications. With regard to the invention, the synchronization entity is preferably designed to automatically serve different applications, thus being designed to transmit descriptions of method calls irrespective of the application software that is actually operated.

A preferred embodiment of the present invention refers to storing descriptions of method calls that could not be transmitted to another electronic device. Whenever two devices are disconnected while using a shared application, descriptions that are not transmitted can be stored in order to have them transmitted or at least try to transmit them whenever the network connection works again. Hence, preferably every device acting as a sender of descriptions of method calls is equipped with such a storage function, this function being part of the synchronization entity. This function helps synchronizing application data on different devices by accepting a time delay, even if connection has gone for a while.

In another preferred embodiment of the present invention, the description of a method call is logged and a rollback mechanism is provided for reading the log and for verifying the application data respectively an execution of the underlying operation to the application data.

Usually a different order of executing operations leads to different application data on different devices. Such a different execution order over devices can be caused by a disturbed synchronization, loss of connectivity or other disturbances. This preferred embodiment helps regaining the same "synchronized" application data again after disturbances appeared for example due to loss of connectivity. In order to make sure that the final state of all distributed copies of application data is identical, it may be necessary to do rollbacks, i.e. to "undo" already applied operations, reorder them and make sure that operations are (re-) applied to all copies of the application data in the same order. Hence, descriptions of method calls can be exchanged and diverging copies can be "reconciled" such that all application data match after some settling time. Applying all operations in the same order to all application data can guarantee that the final state of all application data is identical, provided that the initial state of application data copies was the same, that the operation are deterministic and no side effects occur.

This embodiment can be in particular supported by providing a "global time" for the devices and thus creating fairness among participating devices with respect to concurrent modifications. The introduction of a global time gives support in a way that in the very end all application data have undergone the same order of operations by applying the same order of method calls.

The mentioned occasional necessity to do such rollbacks and to reapply operations to application data in a new, different order may preferably require that in connection with each application data copy there is a "log" maintained of recent operations together with either a copy of the application data and in particular its state at the starting point of that log (the so-called rollback-point) or with additional information that allows to reverse all operations at least back to the point up to which there had been consensus between all application data copies.

The maintenance of such logs plus all additional data that may be required to resolve the conflicts belongs to the duties of any replication infrastructure supporting this embodiment of the invention.

This rollback function is preferably implemented as part of the synchronization entity. Log-information is preferably kept by the replication infrastructure at least until it can be decided that all replicas have applied all operations in the same order. At that point the logs can be pruned.

In another preferred embodiment, the application data is copied from the first electronic device to the second electronic device before operating the copy of the application data on the second electronic device. This is to have identical application data when starting sharing application data. Alternatively the copy of application data on the second device can be generated by determining all method calls that were executed for obtaining the initial application data on the first device, generating a list of descriptions of these method calls on the first device, transmitting this list to the second device, translating the list of descriptions into method calls that are executable on the second device, and executing these derived method calls on the second device starting from an empty application data state. This preferred method examines the initial application data model on the first device and derives a list of method calls that were processed to obtain this model. This list is then translated into a list of descriptions of method calls. Such a list of description for a model having tree structure could look like: {create Node A; create Node B; append Node B to Node A; create Node C; append Node C to Node A; create Node D; append Node D to Node C; . . . }. Preferably this all is performed by the synchronization entity of the first device. The list of descriptions is then transmitted to the second device, translated there into method calls which are executed there starting with a void application data sate. Consequently, the resulting model on the second device is a copy of the model on the first device.

According to another aspect of the present invention, there is provided an electronic device for executing an application, comprising application data upon execution of the application, an interface for receiving messages from another electronic device, a synchronization entity for receiving a description of a remotely generated and remotely to be applied method call from the interface and for translating this description into a locally executable method call, and a central control unit for processing the application data according to the method call derived from the received description.

This electronic device can preferably act as backup device for other electronic devices, even without showing transmitting capabilities for sending descriptions to other devices.

According to another aspect of the invention, there is provided an electronic device for executing an application, comprising application data upon execution of the application, a central control unit for processing the application data according to a locally generated method call, an interface for transmitting messages to another electronic device, and a synchronization entity for generating a description of the method call and for passing the description to the interface.

This electronic device can preferably act as a master device or testing device in order to have other electronic devices synchronized, even without showing receiving capabilities for receiving descriptions of operations from other devices.

The present invention also extends to an electronic device for executing an application, comprising application data upon execution of the application, an interface for exchanging messages with another electronic device, a synchronization entity for receiving a description of a remotely generated method call from the interface and deriving a locally executable method call from the description, and for generating a description of a locally generated method call and passing this description to the interface, and comprising a central control unit for processing the application data according to the derived method call and according to the locally generated method call.

According to another aspect of the invention, there is now provided a method of processing application data in an electronic device, the method comprising: generating locally a method call for processing the application data; generating a description of the method call; transmitting the description to another electronic device; and processing the application data according to the method call.

The present invention also extends to a method of processing application data in an electronic device, comprising: receiving a description of a remotely generated and to be remotely executed method call from another electronic device; deriving a locally executable method call from the description; and processing the application data according to the derived method call.

The present invention further extends to a method of processing application data in an electronic device, comprising: generating locally a method call for processing the application data; generating a description of the method call; transmitting the description to another electronic device; processing the application data according to the locally generated method call; receiving a description of a remotely generated method call from another electronic device; deriving a locally executable method call from the description; and processing the application data according to the derived method call.

In accordance with another aspect of the present invention, there is provided a method of preparing processing application data in an electronic device, comprising: receiving a method call from an application program interface; generating a description of the method call; causing the description to be passed to a device-to-device interface of the electronic device; and providing an application program interface with the method call for application data processing purposes.

The invention also extends to a method of preparing processing application data in an electronic device, comprising: receiving a description of a remotely generated and remotely to be executed method call from a device-to-device interface of the electronic device; deriving a locally executable method call from the description; and providing an application program interface with the derived method call for application data processing purposes.

According to another aspect of the present invention, there is provided a method of preparing processing application data in an electronic device, the method comprising: receiving a method call from an application program interface; generating a description of the method call; causing the description to be passed to a device-to-device interface of the electronic device; providing an application program interface with the method call for application data processing purposes; receiving a description of a remotely generated method call from the device-to-device interface; deriving a locally executable method call from the received description; and providing the application program interface with the derived method call for application data processing purposes.

All methods steps are preferably computer implemented steps.

Note that the order of steps within a claimed method can be interchanged to some extent. Especially transmitting and/or receiving descriptions of method calls and passing on local descriptions of method calls to be processed can be performed in different orders.

The invention also extends to a computer program element comprising computer program code means which, when loaded in a processor unit of an electronic device, configures the processor unit to perform a method as hereinbefore described.

Advantages described with reference to the arrangement of electronic devices and the method of processing a set of application data as well as with reference to embodiments thereof are also considered beneficial for the hereinbefore described electronic devices and methods of processing application data as well as respective embodiments.

BRIEF DESCRIPTION OF THE DRAWINGS

Preferred embodiments of the present invention will now be described, by way of example only, with reference to the accompanying drawings, in which.

Different figures may show identical references, representing elements with similar or uniform content.

DETAILED DESCRIPTION OF THE DRAWINGS

Figure 8:
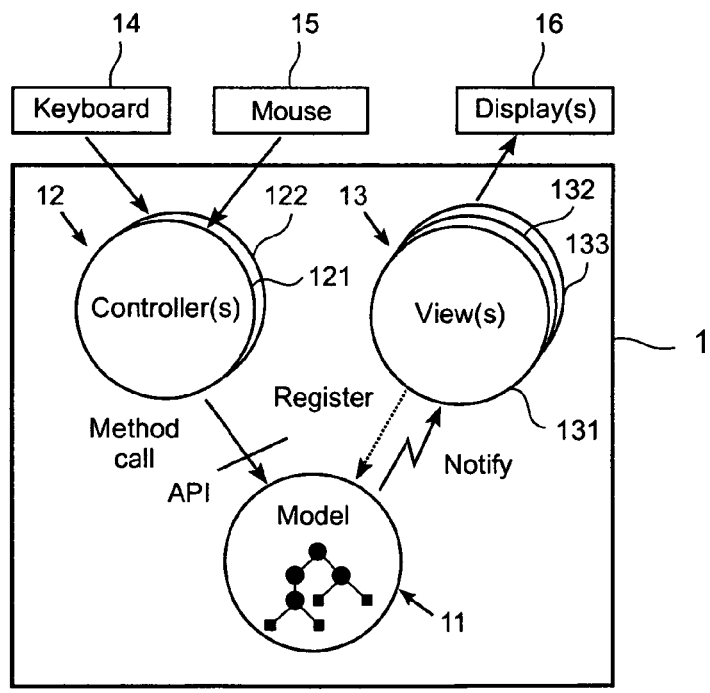

Before starting to describe embodiments of the present invention with reference to the accompanying drawings, a "Model-View-Controller" (MVC) pattern is introduced, which helps explaining the embodiments later on. The MVC pattern can generally be understood as a design structure with regard to application software and moreover as a structure defining computer internal interfaces for accessing application data that is processed by the associated software application. FIG. 8 shows such a known MVC scheme with regard to an electronic device 1.

According to this scheme, software is structured such that an applications' state is encapsulated in a so-called "Model" 11—which is considered to be included in the term "application data" that is used with regard to the invention. This model 11 offers an application program interface API, i.e. a set of well-defined method calls, via which a "Controller" 12, which interprets a user's input, modifies and/or changes the state of the model 11. Note that it is quite common to have several distinct controllers 121, 122, e.g. one for keystrokes from a keyboard 14, another for manipulations of a pointing device 15, e.g. mouse-movements and mouse-clicks and, say, a third one that is not explicitly shown in FIG. 8 but may handle a user's utterances in the case of voice-input/-control. Consequently a controller in the MVC context is rather understood as a function than as a hardware control unit.

One or more so-called "View(s)" 13 can register with the model 11, thereby indicating, that it/they need to be informed in case of state changes of the model 11. The model 11 maintains a list of all registered view entities, and if the model's state changes, all of them are notified about the change. Again, there may be several views 131, 132, 133 observing the same model, e.g. to display different "aspects" of the same model. These views 131, 132, 133 are automatically kept synchronized by observing the very same single model 11. Note that the term "View" stems from the pattern's field of origin (GUI-design) and that a "View" could also be named "observer" or "renderer". A view does not necessarily have to display anything although the view 133 in FIG. 8 is connected to one or more displays 16; a view could also be an invisible entity, e.g. generating voice-output. In fact, it does not even have always to report back to the user, but could also be a unit that triggers some physical action, e.g. activating some valve or starting some actuator's motor based on a model's state or state transition. Consequently a view in the MVC context is rather understood as a function than as a hardware display unit.

Figure 1:
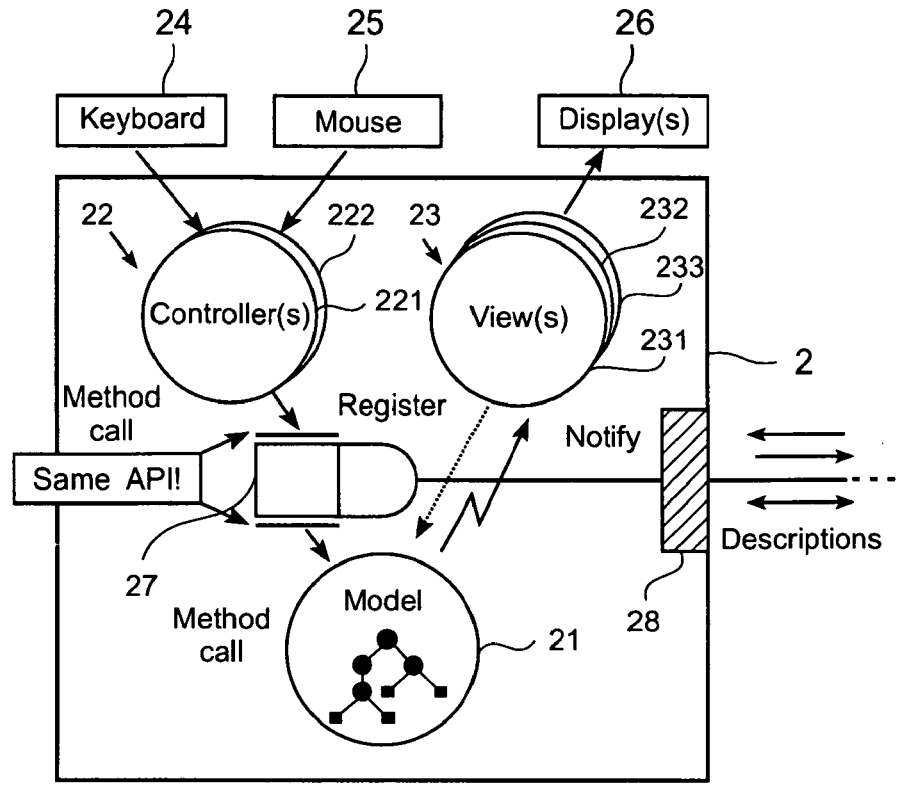
FIG. 1 a diagram of an electronic device in accordance with the present invention, FIG. 2 another diagram of the electronic device according to FIG. 1 in accordance with the present invention, FIG. 3 a diagram of an arrangement of electronic devices in accordance with the present invention, FIG. 4 another diagram with regard to the arrangement of electronic devices according to FIG. 3 in accordance with the present invention, FIG. 5 a scheme of a shared session with multiple users and devices in accordance with the present invention, FIG. 6 a flow chart of methods of processing application data in accordance with the present invention, FIG. 7 a diagram of an inventive arrangement of devices, and FIG. 8 a diagram of a known electronic device.

Referring now to preferred embodiments of the present invention, FIG. 1 shows a MVC-style diagram of such a preferred embodiment of an electronic device 2. Application data are encapsulated in the "Model" 21. By way of example, this application data can represent the actual state of a particular word processing document that is actually processed by a device's user by executing a word processing application software. The model 21 offers an application program interface API, i.e. a set of well-defined method calls, via which a "Controller" 22, which interprets a user's input, modifies the model 21, or, in more general terms, operates or processes the application data. Controllers 221, 222 interpret user's input and translate this input into one or more method calls, which can be for example a specific command that makes the application data change when being operated. The controllers 221, 222 in general receive user's input, translate this input into one or more method calls and invoke the intended operation on the model 21. The distinct controllers 221, 222 are used to translate e.g. keystrokes from a keyboard 24 or manipulations of a pointing device 25, e.g. mouse-movements and mouse-clicks and handle a user's utterances in the case of voice-input/-control—which is not explicitly shown in FIG. 1—, and translate this input into a method call and in the end process this operation. Upon this operation, the model 21 changes its state.

One or more so-called "View(s)" 23 can register with the model 21, thereby indicating, that it/they need to be informed in case of state changes of the model 21. The model 21 maintains a list of all registered view entities, and if the model's state changes, all of them are notified about the change. Again, there may be several views 231, 232, 233 observing the same model, e.g. to display different "aspects" of the same model. These views 231, 232, 233 are automatically kept synchronized by observing the very same single model 21. Note that the term "View" stems from the pattern's field of origin (GUI-design) and that a "View" could also be named "observer" or "renderer". A view does not necessarily have to display anything although the view 233 in FIG. 1 is connected to one or more displays 26; a view could also be an invisible entity, e.g. generating voice-output. In fact, it does not even always have to report back to the user, but could also be a unit that triggers some physical action, e.g. activating some valve or starting some actuator's motor based on a model's state or state transition. Consequently a view in the MVC context is rather understood as a function than as a hardware display unit.

Now, a synchronization entity 27 is introduced serving as a generic replication middleware that intercepts all controller-operations that were intended for the model 21, translates the respective method calls into descriptions and passes the descriptions to an interface 28 that takes care of distributing these descriptions to other electronic devices and/or of receiving descriptions from other devices. This alternative one-way out, one way-in or bi-directional communication is indicated by respective arrows. Usually, electronic devices and especially the synchronization entity 27 will provide bi-directional communication and therefore transmit and receive descriptions of method calls, but special applications like the use of a device as backup device might justify receiving-only or even transmitting-only capabilities with regard to descriptions of method calls.

Received descriptions of remotely generated method calls are translated into locally executable method calls and are applied to the local copy of the model 21. Locally generated method calls are passed through and are executed on the local copy of the model 21. Descriptions of locally generated method calls are generated and passed to other devices in order to have remote copies of the model updated in the same way the local copy of the model 21 is updated by applying the same operations. In a preferred embodiment, only those locally generated method calls that modify application data are translated into descriptions. Such a "writing" method call causes an amendment to the application data while a "reading" method call not necessarily has to be translated into a description and has to be transmitted to another device.

The model 21 changes its state in accordance with the method calls—either locally generated or derived from a received description—that invoke operations on the application data and will notify its respective views/observers 23.

In order to minimize or even eliminate the necessity of changes of already existing parts of the application, the synchronization entity 27 exhibits the exactly same application program interface API towards the controller as the model 21 does. The synchronization entity 27 on the other hand uses the model 21 to "feed in" locally and/or remotely generated method calls to be executed, thus also allowing to keep the structure of the view(s) 23 completely unchanged.

Figure 2:
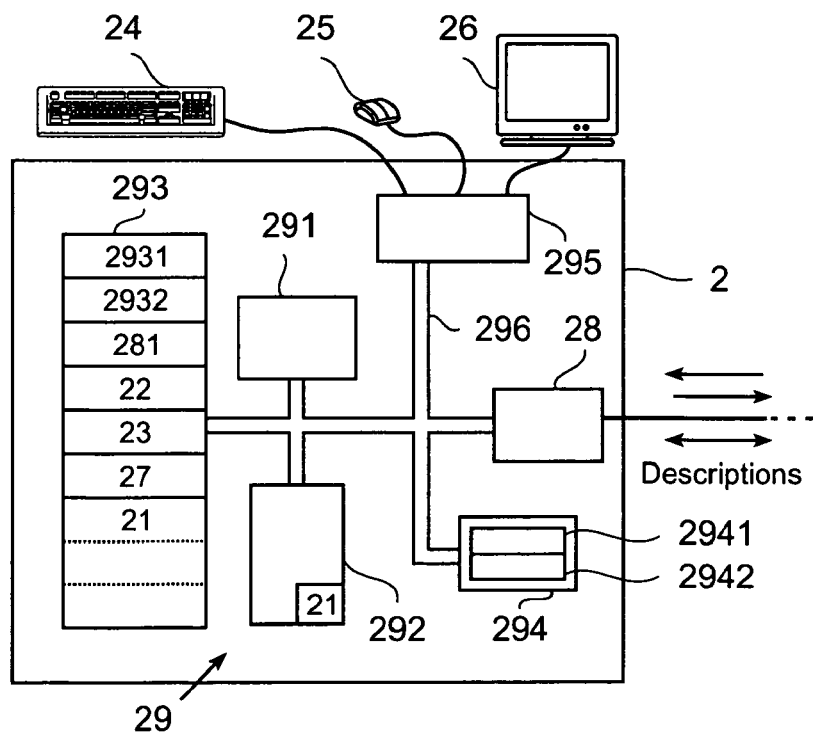

FIG. 2 shows another diagram of the electronic device according to FIG. 1, which is more focussed on explaining the device's underlying hardware. Hardware parts 29 of the electronic device comprise at least a central processing unit CPU 291, a local memory 293, a random access memory RAM 292, a register unit 294, an input/output unit 295 and an interface 28. These units are interconnected via a system bus 295. Again, a keyboard 24, a pointing device 25 and a display 26 are connected to the electronic device 2 and in particular to the input/output unit 295.

The following pieces of software are stored in the local memory 293: Underlying application software is indicated with reference number 2931, driver software for the interface is indicated with reference number 281, controller and view software with functions explained in connection with FIG. 1 are indicated with reference number 22, respectively 23, code specifying the synchronization entity is referenced by number 27. Application data 21 that are about to be processed by the CPU 291 are copied from the local memory 293 to the RAM 292.

The register unit 294 comprises a register 2941 assigned to descriptions of locally generated method calls that failed to be transmitted to other electronic devices via the interface 28. Register 2941 serves for storing all descriptions of locally generated method calls that could not be transmitted during a shared session. Whenever connection to other temporarily disconnected device is established again, the descriptions being stored can be transmitted and the underlying operations can be executed by the other device.

The other register 2941 can be used as a log for storing descriptions—preferably including a time stamp—that are processed on the local application data, the descriptions describing either locally or remotely generated method calls. Together with a rollback entity software piece 2932, which is preferably part of the synchronization entity 27 and is also responsible for generating the log-information that is to be kept by the replication infrastructure for the case of rollbacks, it can be guaranteed that all method calls with either local or remote origins are applied to the application data in the same order. This can be achieved by checking the logs of the devices regularly or on demand and by running an ordering algorithm which is applied to all logs in order to guarantee the same execution order everywhere. In case of differences, the rollback mechanism can run until it can be decided that all replicas have applied all operations in the same order. At that point the logs can be pruned.

Note that the register 294 is not necessarily embodied as separate hardware part 29 but also may be part of another storage unit of the device. Data stored on the local memory 293 can alternatively be read from drives.

Figure 3:
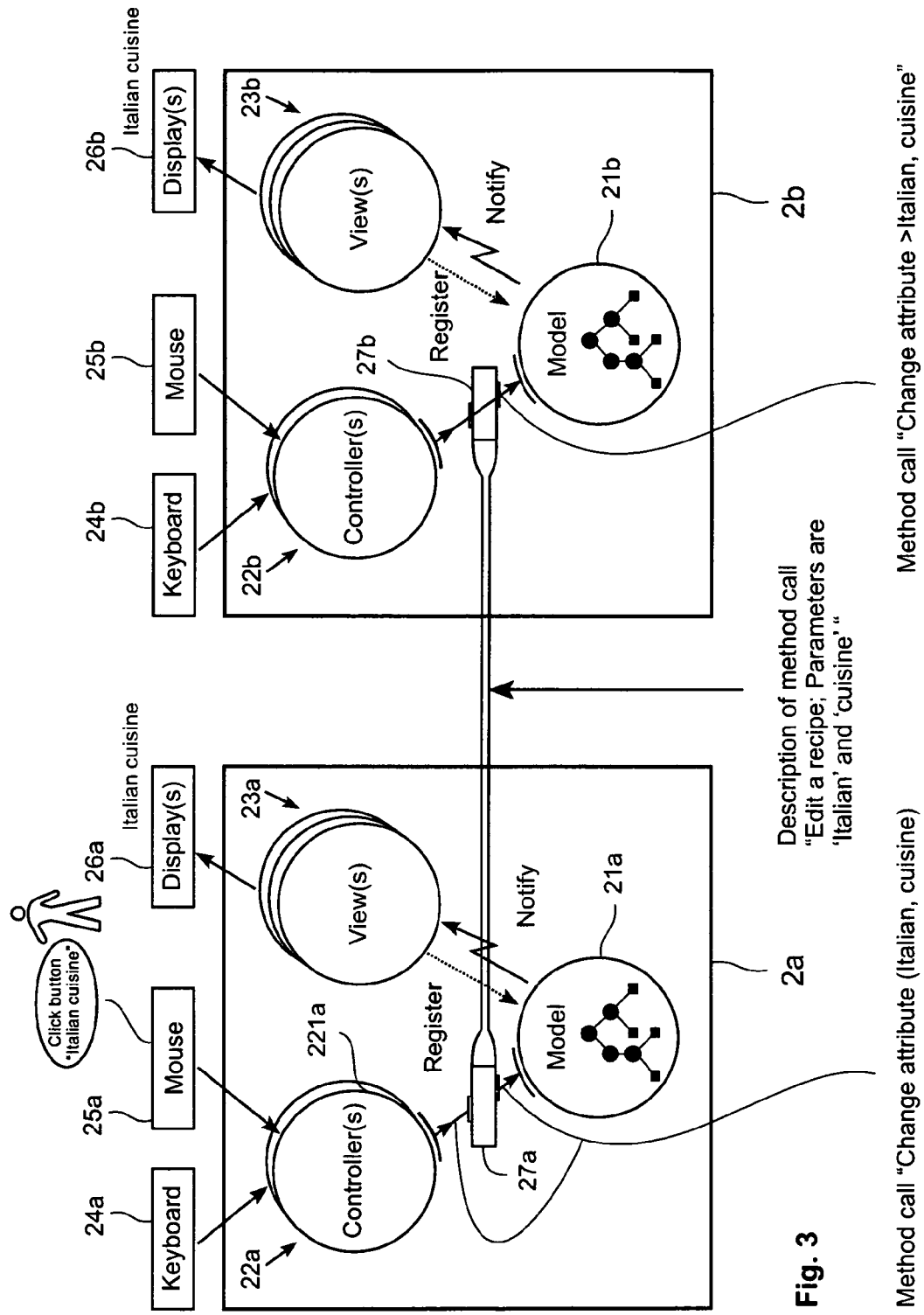

FIG. 3 shows an arrangement of electronic devices comprising two connected electronic devices 2a and 2b both of them showing a setup being identical to the setup of the electronic device according to FIG. 1. In this preferred embodiment, the devices 2a and 2b are regarded as peer devices. Even more specifically, theses devices 2a and 2b can be identical devices. Reference numerals used with regard to FIG. 1 are now extended with "a" and "b" in order to indicate the affiliation to device 2a or to device 2b. According to FIG. 3, the synchronization entities 27a and 27b of the devices 2a and 2b are connected. This connection indicates a high level data connection since the essential data transfer between the synchronization entities 27a and 27b is achieved by a conventional interface between the two devices 2a and 2b. The link between the synchronization entities 27a and 27b indicates that these entities 27a and 27b are preferably implemented as middleware and therefore serving for many different applications on a device. These entities 27a and 27b control the exchange of descriptions of method calls and therefore provoke synchronous replicas of application data on different devices, meaning application data have the same state. The synchronization entities 27a and 27b serve for self-initiated updating of application data by exchanging descriptions of method calls.

In a multi-device configuration several or even all middleware instances interconnect in the above described way and at least in a first step intercept operation invocation. In case an input is interpreted into an API compatible method call, a corresponding description of this method call is generated and distributed to the other peer devices. The description is taken and added to a local description of method call log for backtracking reasons. On each peer device the respective middleware receives the description of this method call and translates its content into a method call that is executable on the respective peer device. Then the respective method call invokes the respective operation on the local model. Finally, each model executes the same operation and changes its state. Views are notified about state change by sending an event. each view updates rendering.

This method is indicated in FIG. 3 by way of example: A user is running an application on device 2a for showing different recipes. By way of a mouse click on keyboard 25a he is demanding to have a recipe of the italian cuisine edited. This action is indicated symbolically at the pointing device 25b. The corresponding controller 221a is interpreting this input and creates an API method call "Change Attribute (cuisine, italian)" comprising parameters "cuisine" and "italian", that can be understood by the application. Before or simultaneous to invoking the operation "edit recipe of italian cuisine" on the model 21a, the synchronization entity 27a of device 2a creates a description of this method call like "Edit a recipe; Parameters are 'italian' and cuisine'" and transmits/replicates this description to the synchronization entity 27b of device 2b. The method call itself is not transmitted, since the device 2b might provide another set of method calls in order to invoke the same operation. In addition, this description is logged. The synchronization entity 27b of device 2b receives the description and translates it into a locally executable method call, for example "ChAtt > italian, cuisine". Now the editing operation can be applied to both models 21a and 22b by the respective method calls. The application and its data/state of both devices 2a and 2b have changed. Now the demanded recipe is edited and shown on displays 26a and 26b of both devices 2a and 2b due to change in application states of models 21a and 21b, provided they had the same state before invoking the operation.

Figure 4:
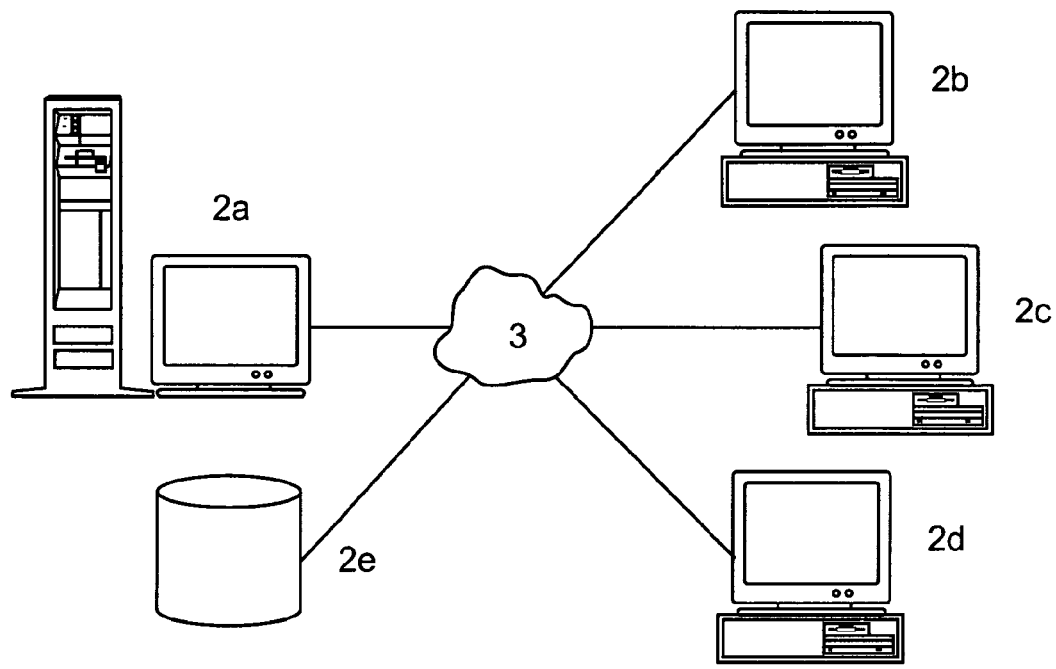

FIG. 4 shows another diagram of connected electronic devices 2a up to 2e, including devices 2a and 2b shown in FIG. 3. A tower computer represents device 2a, desktop computers represent devices 2b, 2c and 2d, and a backup server represent device 2e. A network 3, representing for example the Internet, connects the electronic devices 2a up to 2e. Via the network 3, the synchronization entities 27a,b,c,d,e of the devices exchange descriptions of method calls.

Figure 5:
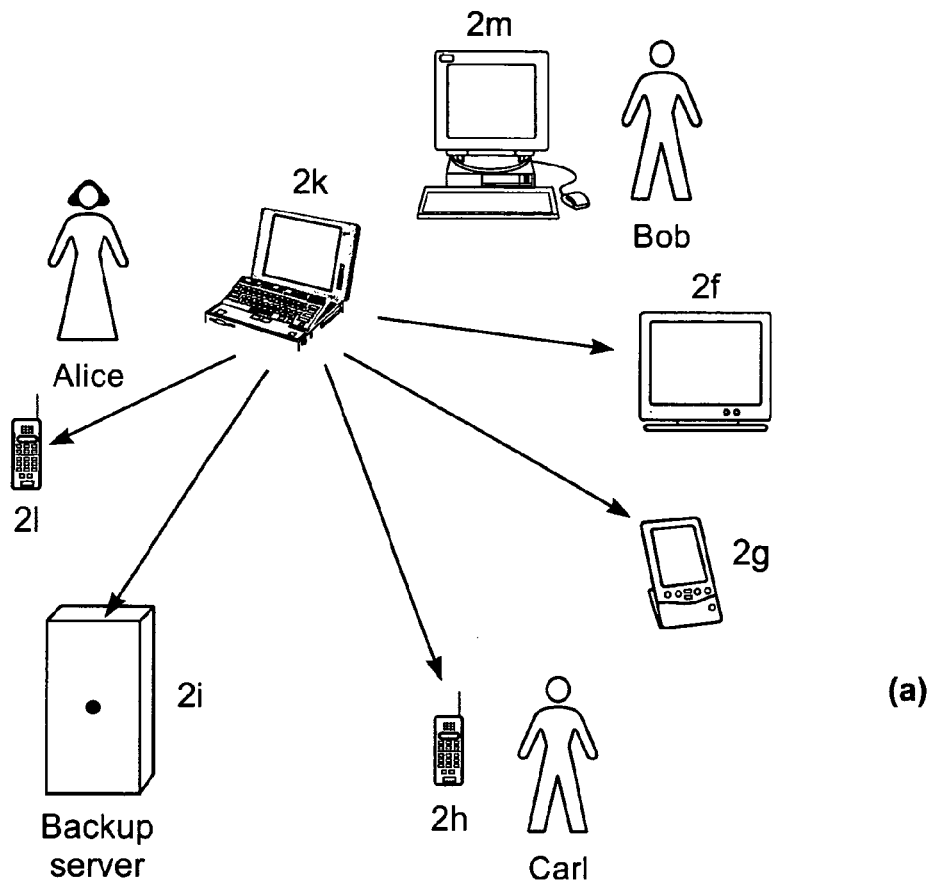
Figure 5:
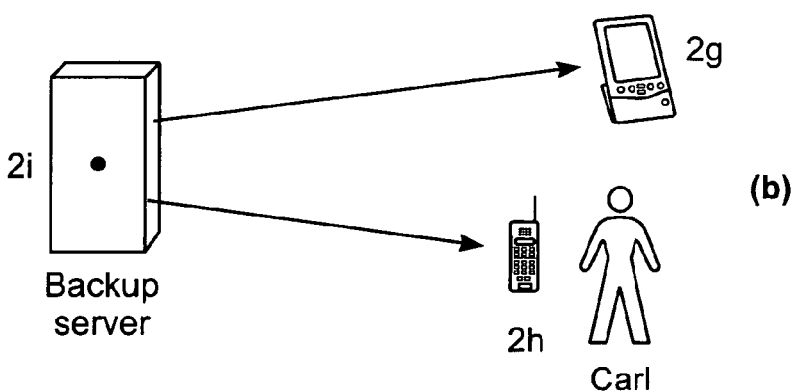

FIG. 5a illustrates symbolically a user scenario with Alice, Bob, and Carl being participants in a joint session, all having a copy of the same application data running on their devices, namely on the laptop 2k and cellular phone 21 of Alice, on the desktop computer 2m and the workstation 2f of Bob and the desktop computer 2g and the cellular phone 2h of Carl. In addition there is a backup server 2i installed for backing up the joint session, also operating a local copy of the application data. The symbolic dot in connection with the devices 2x points out the existence of synchronization entities according to the invention.

Assume that Alice makes a change in her local copy of application data. This change will propagate immediately to all the other devices including the backup server 2i.

According to FIG. 5b, the scenario changed. Alice and Carl are off-line. When Alice now makes a change to her application data, this change only propagates to the application data copies of her devices in case these are still connected. When Alice is back online, the change propagates to the devices that are online due to a backup log that registers not transmitted method call descriptions and initiates their supply when connectivity is back. When Carl becomes online again, he—respectively his online devices 2g and 2h—will receive the method call descriptions from the back-up server 2i.

Figure 6:
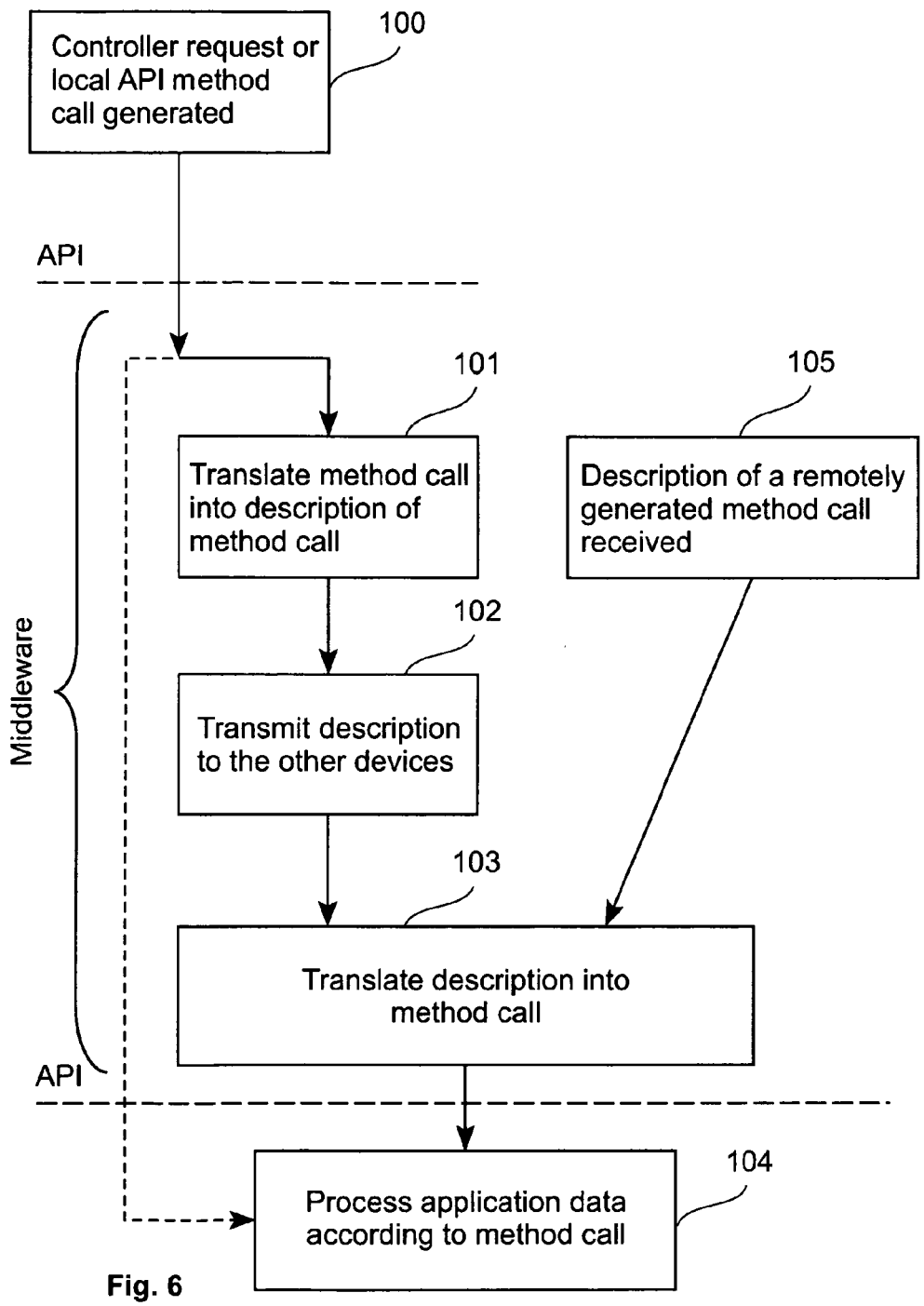

FIG. 6 discloses a flow chart of methods of processing application data. The flow chart is drafted for a method showing transmitting and receiving capabilities running on an electronic device. In a step 100, there might exist a local controller request or a local API method call waiting to be executed. Such a method call is translated into a more general description of this method call and the underlying operation in step 101. In step 102, this description of the method call is passed to a device-to-device interface of said electronic device to be transmitted to another device. Then, the description of the method call is translated back into the original method call in step 103. This method call is passed on to be applied to a local copy of application data. In step 104, the local copy of application data is processed by execution of the method call.

Instead of deriving the method call again from the description in step 103, the initial method call introduced in step 100 can be passed through and directly applied to the application data in step 104. This way is indicated by the dotted line. Step 103 would therefore be redundant. An interface connects the present device with another device for performing a shared application session. If there is a description of a remotely generated method call detected in step 105, this description is translated in a locally executable method call in step 103. This step is then executed in step 104 and causes a modification in application data of the device.

Dotted lines and "API", labeling indicate present API method calls. A bracket indicates the responsibility of the middleware. Bare receiver or bare transmitter devices lack the transmitting respectively receiving steps of this flow chart. The method running on a counterpart device is preferably reversed image.

In general following scenarios are preferred for applying the invention: Synchronization of application data can be advantageously achieved between different devices of the same user: A user can therefore keep working on the same application by way of example in his office and at home after having returned from office. In another environment a user may have several devices available, these devices having different user interface capabilities or input/output features. Now, the user can switch between the devices to reach best input/output performance for his needs: Assume that the first device only shows speech input/output opportunities while another device shows display capability, then the user can link the synchronization entities of these devices and use all different input and/or output units of these devices in order to process application data. Another field of adopting the invention is application sharing among different users, by way of joint editing, shared white-boards, and so on. In this context, education, teaching and support can also be simplified and less time consuming configured when using the invention. In case a server is included as electronic device, this allows performing additional valuable processes like persistency or backup processes, auditing, indexing, agents or directory services, as well as bridging processes for non-overlapping online times, and much more.

However, there might exist software applications that do not have access to the above mentioned synchronization software. These software applications might not even be shared by applying other distributed computing approaches. As a consequence, users of such software applications can not participate in shared application sessions by forming different groups of peers and, by way of example, perform joint editing of documents or share whiteboards.

However, computer users are familiar with a "cut/copy and paste" paradigm enabled by the clipboard in their local graphic user interface (GUI) environment. This clipboard is a piece of software usually being part of the operating system software and allows a user to cut or copy pieces of arbitrary application data from one local application and paste them into some other local application, independent from an application's type. In this context, the clipboard software manages mainly storage allocation for temporarily storing the application data, wherein usually only one piece of application data can be latched at once. Clipboard function's "copy" and "paste" can be called by short keys on the computer's keyboard, that is a key combination of e.g. "control key+C key" for copying and "control key+V key" for pasting. These short keys are independent from any application.

In order to make such virtually not sharable local data available to shared applications or to remote local applications, it is appreciated that in addition to an electronic device's local clipboard there is provided a session clipboard for shared use. Accordingly, such an electronic device comprises a local clipboard function and a clipboard function associated with a shared application. Preferably every shared application of an electronic device comprises its own session clipboard. The session clipboard preferably manages also mainly storage allocation for temporarily storing allocated application data.

Preferably, in an electronic computing device there is provided a hierarchy of clipboards comprising a user's/device's local clipboard that represents the well-known clipboard function. In addition, there is provided one distributed clipboard per session a user is participating in. The latter is shared among all members of the peer group in that session.

Distributed session clipboards are preferably part of a collaboration software—also called middleware on top of which shared applications run—that is installed in all the computing devices—or peers—participating in an application session. This middleware is basically in charge of interconnecting the different computing devices, propagating application data and changes to data to all of them and ensuring that this data are consistent across devices. This software can be based in e.g. real time replication of data to ensure changes made by any participant are visible to all other participants. The middleware software shows preferably the characteristics described in the spec hereinbefore and thus the ability to transmit and/or receive descriptions of method calls. Thus, the preferred clipboard arrangement is an additional feature to the proposed inventive basic concept of sharing application data in order to include non-sharable applications into this concept. However, the proposed clipboard arrangement, the appreciated methods, the corresponding devices, arrangement of devices and software can also be regarded as individual concept and be applied to methods, devices or software that pursue other data sharing concepts than the inventive concept introduced above.

In an arrangement of electronic devices, every participating device comprises in addition to the electronic device's local clipboard a session clipboard for shared use with other devices. Preferably, every shared application comprises its own session clipboard. There may be only one common session clipboard for each session, that is made available to each participating device. Meaning the same but expressed in a different way, each participating device owns a copy of a session clipboard such that the application data transferred to a device's session clipboard is transmitted to the other device's session clipboards such that local copies of the application data are available on each device.

Accordingly, a suggested method applied to an electronic device comprises steps of copying selected pieces of application data from a local application to a local session clipboard via the local clipboard, such that the data in the session clipboard is automatically available to all participants of a shared session, and/or pasting data from the session clipboard into a local application via the local clipboard.

The origin of application data that shall be transmitted to a remote device is not limited to a local application but can also include another local copy of shared application data or even another session clipboard.

In the same way, the receiving entity of application data on a remote device is not limited to a local application but can also include another local copy of a shared application or even another session clipboard.

With regard to an arrangement of electronic devices, a method of distributing application data is appreciated wherein locally selected application data is copied to a session clipboard via the local clipboard, wherein the session clipboard is responsible for distributing the data contained in the session clipboard to a remote device, and wherein the distributed data is pasted from the session clipboard respectively its copy into a local application or another session application via the local clipboard.

Hence, a multi-user environment is supported that comprises the user's personal clipboard and shared session clipboards, and that provides users with the possibility to transfer data within this hierarchy. This is a natural and seamless way for users in such environments to share arbitrary pieces of data. Now, a user participating in a shared application session could use this same paradigm to share local pieces of data with the other peers in a session, as well as to transfer data from one session to another—also called brokering. The hierarchy of clipboards enables participants of a shared application session to selectively propagate data from their local applications—that might not used to be sharable—to the other participants of the session, or to transfer data from one session to another.

Figure 7:
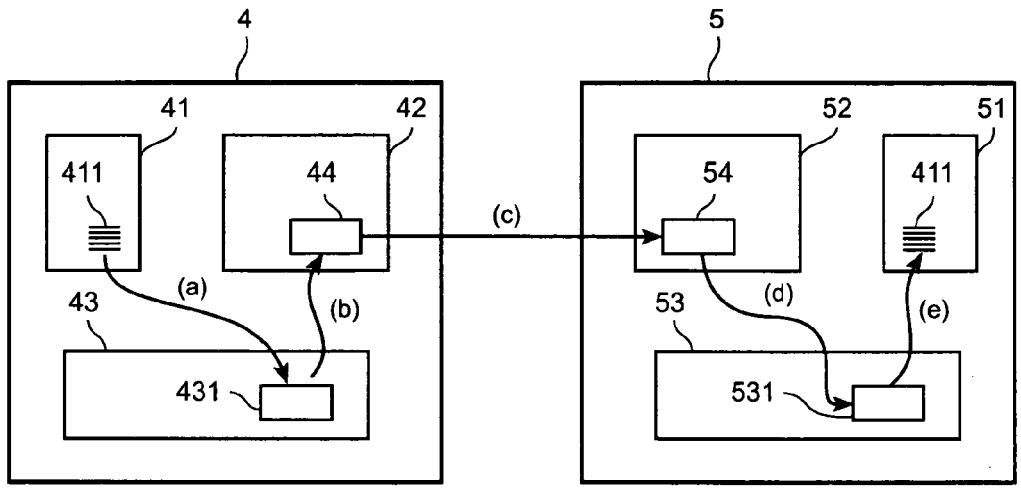

FIG. 7 shows a diagram of an arrangement of two electronic devices 4 and 5, the device 4 comprising a locally running application 41, comprising a copy of a shared application 42, and comprising an operating system 43, all references 41, 42 and 43 representing software. The device 5 comprises a locally running application 41 that is preferably another sort of application than application 41, comprising a shared application copy 52 matching the shared application copy 42, and comprising an operating system 53, all references 51, 52 and 53 representing software. Operating systems 43 and 53 comprise clipboard functions 431 respectively 531. Allocated to shared application copy 42 is session clipboard 44 and allocated to shared application copy 52 is session clipboard 54, both session clipboards 44 and 54 being part of a middleware. Application copies 42 and 52 as well as session clipboards 44 and 54 are prepared to exchange data.

Assume, the user selects a piece of application data 411 in the local application 41 of FIG. 7 and copies it into his/her personal clipboard 431 by invoking the traditional copy/cut function—step a). Supported from the collaboration software interface, the user selects the option to copy the contents of the personal clipboard 431 into the distributed clipboard 44 of a specific session—step b).

This step b) is preferred for security/privacy reasons, so that not all data in the personal clipboard 431 be automatically shared, since the user might not even be aware of or remember which—potentially confidential—data he/she has last copied to his/her personal clipboard 431. A separate "distributed clipboard" per session is preferred, in order to allow a user—who might be involved in two or more sessions with different peer (-group)s at the same time—to select with which peer(s) he/she wants to share a specific piece of data.

A reference to the piece of application data 411 in the session clipboard 44 of device 4 is transmitted—e.g. replicated—to the other device 5—step c)—and maybe to more peer devices that participate in that session. Accordingly, the session clipboard 54 of device 5 now contains a copy of the application data 411.

When a user of device 5 now selects the "paste" option from the collaboration software interface, the data from the distributed session clipboard 54 is then pasted into the personal clipboard 531—step d) and can later be used in any local application 51, by invoking the local paste function—step e).

In another embodiment, a Java™ (Trademark of Sun Corporation) implementation of the clipboard concept—based on Java™ data transfer framework—is introduced:

First, for comprehension reasons, steps in a single device environment are described that are standard procedures in Java™ data transfer framework, wherein the following terms "CopySource", "Transferable" and "DropTarget" are taken from that framework:

1) The user first selects a piece of data in a local Java™ application and copies it into the local clipboard by invoking the copy/cut function: This operation generates a "Transferable" object, which holds a description of all possible data formats in which the source application—which has to implement the "CopySource" interface—could provide the data.

2) That "Transferable" object is put into the "system clipboard".

3) When the data is to be pasted into the same or another Java™ application—which has to implement the "DropTarget" interface—that application fetches the Transferable object from the system's clipboard. It requests the format descriptions from the Transferable, inspects it and checks, whether and if so, which of the offered formats it can understand. If it can handle more than just one of the formats offered, it picks the one it considers most suitable.

4) It then requests the data to be pasted from the Transferable object in the format it chose in the previous step.

5) The Transferable object returns the data in the format requested. It can do so, because it either already contains the data in all possible formats, or because it contains a reference back to the original application and object and thus can now request it in the chosen format. The decision, whether the data is immediately copied to the Transferable in all possible formats or only is created on demand usually depends on the kind of application and the object being copied/cut: if that object is small—e.g. is only a short piece of text—the creation and storage in several different formats does not cause too much processing overhead and memory burden on the system. If the object, however, were e.g. a large image, creating and storing it in several formats—e.g. in .gif/.jpg/.bmp/.ps/ . . . —could cause a major memory and performance problem for the system. In that latter case only a reference would be stored in the Transferable and the actual data would only be created when actually requested by the "DropTarget" and only in the format asked for.

The distributed session clipboard in clipboard hierarchy according to the invention introduces new steps, these new steps (1s . . . 5s, and 1r . . . 5r) are disclosed in an amendment style of the above described steps 1) to 5):

With regard to the "copy/cut"-function on the "sender's" side:

1s) User S(ender) selects . . . (else as 1) above).
2s) That "Transferable" object is put into the "system clipboard" (else as 2) above).
3s) User S (ender) pastes into a specific session's clipboard, e.g. by selecting that session's icon and executing the paste function.
4s) In case the Transferable already contains the data in all possible formats, a copy of the Transferable is created and replicated to all devices and users involved in that session.
5s) In the case, where the Transferable does not contain the data in all possible formats, a "proxy" of the local Transferable is created and replicated to all devices and users involved in that session. That proxy-Transferable contains only the format descriptions and the address of the original Transferable.

With regard to the "paste"-function on the "receiver's" side:

1r) User R(eceiver) selects the session's icon and executes the copy function, thereby putting that session's proxy-Transferable onto the receiver's device's clipboard.
2r) User R pastes into the "DropTarget", i.e. the target application.
3r) The target application requests the format descriptions from the Transferable('s-proxy) and selects a suited format.
4r) It then requests the chosen format from the Transferable.
5r) If the Transfereable is:
a copy of the original Transferable it already contains the data in the desired format and can thus directly provide it to the "DropTarget", which pastes/integrates the data into the application data at the designated position.
a proxy, it contains the address of the original Transferable. The proxy connects back to the original Transferable and requests the data in the format selected by the "DropTarget". The original Transferable generates the data in the requested format—as it would in the single-device case—and send them back to its proxy. The proxy-Transferable provides the data to the requesting "DropTarget"

What is claimed, is:

1. An electronic device for executing an application, comprising:
application data of said application;
a central control unit for processing said application data according to a first method call, said first method call provided to execute an operation on a local copy of the application data on a second device;
an interface operatively coupled with the central control unit for transmitting a description of the first method call to the second electronic device, wherein the transmitted description is used by the second electronic device to derive a second method call that is executable on the second electronic device, wherein the first method call itself is not transmitted to the second electronic device; and
a synchronization entity operatively coupled with the interface, said synchronization entity configured to perform: generating the description of the first method call; and passing said description to said interface, wherein said local copy of application data on said second device is generated by:
determining all method calls that were executed for obtaining said initial application data,
generating a list of descriptions of these method calls,
transmitting said list of descriptions to the second electronic device,
translating the descriptions of these method calls into method calls that are executable on said second electronic device, and
executing said method calls on said second electronic device starting from an empty application data state.

2. A method of processing a set of application data, comprising:
using a processor device;
operating application data on a first device
operating a copy of said application data on a second device;
generating a method call for processing said application data;
generating a description of said method call;
processing said application data according to said method call;
using a device-to-device interface configured to perform transmitting said description to said second device;
on said second device:
receiving said description;
deriving a method call from said received description being executable on said second device; and
processing said copy of application data according to said derived method call, wherein said copy of application data on said second device is generated by:
determining all method calls that were executed for obtaining said initial application data on said first device,
generating a list of descriptions of these method calls on said first device,
transmitting said list of descriptions to said second device,
translating the descriptions of these method calls into method calls that are executable on said second device, and executing said method calls on said second device starting from an empty application data state.

3. A method according to claim 2, comprising storing the descriptions that could not be transmitted to said second device.

4. A method according to claim 2, wherein said method call is generated in response to an input action.

5. A method according to claim 2, wherein said application data represent a state of said application.

6. A method according to claim 2, comprising logging said description and applying a rollback mechanism including reading said log description and verifying said application data.

7. A method according to claim 2, wherein said application data is copied from said first device to said second device before operating said copy of said application data on said second device.

8. An article of manufacture comprising a non-transitory computer usable medium having computer readable program code means embodied therein for causing processing of application data, the computer readable program code means in said article of manufacture comprising computer readable program code means for causing a computer to perform steps of:
operating the application data on a first device;
operating a copy of said application data on a second device;
generating a method call for processing said application data;
generating a description of said method call;
processing said application data according to said method call;

using a device-to-device interface configured to perform transmitting said description to said second device;

on said second device:

receiving said description;

deriving a method call from said received description being executable on said second device; and processing said copy of application data according to said derived method call, wherein said copy of application data on said second device is generated by:

determining all method calls that were executed for obtaining said initial application data on said first device, generating a list of descriptions of these method calls on said first device, transmitting said list of descriptions to said second device, translating the descriptions of these method calls into method calls that are executable on said second device, and executing said method calls on said second device starting from an empty application data state.

* * * * *